April 17, 1945.  J. M. SOLYST  2,373,858
DOOR FOR AN ANIMAL HOUSE
Filed April 28, 1943
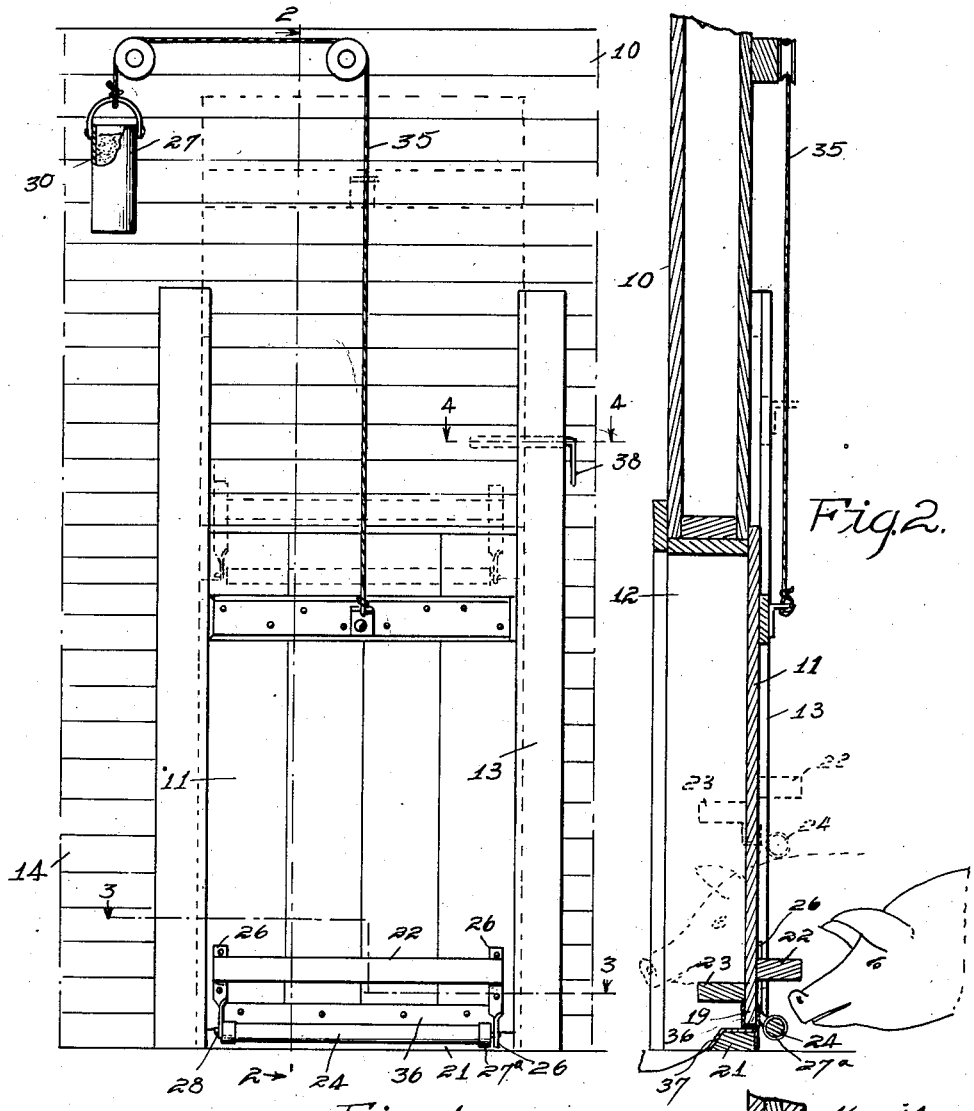
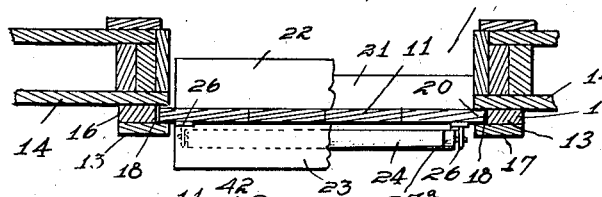
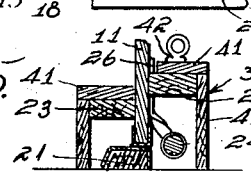
INVENTOR.
Jalmer M. Solyst
BY Rudolph L. Lowell
Atty Patented Apr. 17, 1945

2,373,858

UNITED STATES PATENT OFFICE 2,373,858

DOOR FOR ANIMAL HOUSES

Jalmer M. Solyst, Forest City, Iowa

Application April 28, 1943, Serial No. 484,801

3 Claims. (Cl. 20—19)

This invention relates to doors and in particular to a vertically slidable door for an animal house adapted to be opened by an animal entering the house.

Vertically slidable doors and pivotally swingable doors for animal houses adapted to be opened by an animal entering the house are well known in the prior art. However, the swinging doors in the prior art are generally objectionable because the clearance between the door and the door jamb is generally so great that considerable air drafts occur about the door. As a result, in cold weather, animals tend to group in the house as far as possible away from the door to avoid the drafts. As a result the full space within the house is not usefully employed. Further, the comfort of the house is impaired by the continuous admission of cold air about the door. Another objection to swinging doors is found in the fact that these doors usually swing inwardly of the house so that the space before the door must always be kept open in order for the door to be opened.

Some of the vertically movable doors are opened by an animal in response to the weight of the animal on a treadle means located to each side of the door and operatively connected with the door by various cable and pulley systems. These treadle means are generally unsatisfactory because of their initial high expense, and the jamming of the treadle means, so that it is rendered inoperative, by the packing of straw, snow and the like under the treadle and between the movable parts of the treadle means. Also because of the treadle means being actuated by the weight of an animal the speed at which the door opens is variable between wide limits and unless means are provided to brake the door for heavy animals injury may result to the door by its impact against a stop or the like. Further, unless the treadle means is always maintained in a condition to open the door for the lightest animal to pass therethrough, small animals may be entirely shut out from the animal house.

It is an object of this invention, therefore, to provide an improved means by which an animal is capable of opening a door for an animal house.

Another object of this invention is to provide a vertically movable door for an animal house which in a closed position is in close fitting engagement with a door jamb and door sill so as to eliminate any air drafts about the door and is adapted to be opened with equal facility by both large and small animals.

Yet another object of this invention is to provide a door for a hog-house adapted to be opened by a hog by means simple in construction, inexpensive in cost, readily adapted for application to existing hog-houses, and efficient in operation under all weather and ground conditions.

A feature of this invention is found in the provision of a vertically slidable door for a hog-house having a lifting portion adjacent its bottom adapted to be engaged by the snout of a hog to initially lift the door a distance sufficient to provide for the entrance of the hog's head thereunder. A roller portion carried on the door below the level of the bottom of the door is spaced laterally from the door to prevent injury to the roller and to provide for a flush engagement of the bottom of the door with the door sill. After the initial lifting of the door it is supported, through the roller, on the back of the hog's head and as the hog enters the hog-house the roller rolls across the head and back of the hog so that the door is lifted concurrently with the passage of the hog under the door.

Other objects, features and advantages of this invention will become apparent from the following description when taken in connection with the accompanying drawing in which:

Fig. 1 is a fragmentary elevational view of a side wall of an animal house showing the relative assembly therein of the door and door opening means of this invention;

Fig. 2 is a longitudinal sectional view of the door and the door opening means on the line 2—2 in Fig. 1;

Fig. 3 is a transverse sectional view seen along the line 3—3 in Fig. 1;

Fig. 4 is a fragmentary sectional view on line 4—4 in Fig. 1 showing means for holding the door in an open position; and Fig. 5 is a fragmentary sectional view showing means providing for the door being retained against lifting by an animal.

Referring to the drawings there is illustrated in Figs. 1 and 2 a side wall 10 of a hog-house having a door 11 vertically movable across a door opening 12 in the wall 10. The wall 10 is of a usual construction and the door 11 is guidably supported for vertical slidable movement adjacent the inner side of the wall 10 by door posts 13 comprised of a wall portion 14, a spacing member 16 and a supporting member 17 relatively arranged to form a groove or way 18 for receiving a corresponding side 20 of the door 11. The grooves 18, as clearly appears from Fig. 3, are set back from the sides of the door opening 12 so that there are no open spaces between the door 11 and posts 13 through which drafts can enter the hog-house from around the sides of the door. By virtue of the slidable movement of the door 11 adjacent the inner side of the wall 10 (Fig. 2) a substantially snug fit of the door with the wall at the top of the opening 12 is always maintained. The bottom 19 of the door is flat over its complete length and when the door is closed is in flush engagement with a flat top door sill 21. It is seen, therefore, that when the door 11 is closed the door opening 12 is completely closed so that air drafts around the door are entirely eliminated.

In order for a hog to raise the door 11 and enter the hog-house there is provided a lifting member 22 on the inner side of the door and a lifting member 23 on the outer side of the door and adjacent the bottom 19 of the door (Figs. 2 and 3). Each lifting member 22 and 23 is of a like construction and is comprised of an elongated wooden board laterally extended from the door and secured at one side 25 to a corresponding side of the door 11 by bolts or like means. As shown in Fig. 2 the lifting member 22 is located on the door 11 above the lifting member 23. In practice it has been found that the ground to the outside of the hog-house is generally dug up so as to be at a level below the door sill 21. The position of the lifting member 23 on the outside of the door 11 is thus lowered to facilitate the lifting of the door by the hog as will be later explained.

Adjacent the door bottom 19 is a roller member 24 rotatably supported at each end in a bearing bracket 26. The roller 24 is preferably composed of wood or like material of low heat-conducting characteristics, and is provided at each end with a metal cap 27a and stub shaft 28 which is carried in a corresponding bracket 26 (Figs. 2 and 3). The roller is substantially equal in length to the width of the door 11 and is spaced laterally from the inner side of the door with its lower edge below the level of the door bottom 19. The arrangement of the roller to the inner side of the door prevents it from being fouled or jammed due to weather and outside ground conditions, while its location laterally of the door provides for the flush engagement of the door bottom 19 with the door sill 21. On closing, therefore, the door closes on the door sill 21 so that the roller 24 is entirely protected from the dropping action of the door.

In the lifting of the door by a hog to leave the hog-house, as illustrated in Fig. 2, the hog engages the underside of the lifting member 22 with its snout to initially raise the door. The weight of the door is counteracted by a counter-weight 27 (Fig. 1) which is illustrated as being comprised of a pail filled with sand, indicated at 30. Sand is poured within the pail until the total weight of the counter-weight 27 is a little less than the weight of the door so that the door is easily lifted and is sluggish in its movement by gravity to a closed position. The counter-weight is connected with the top of the door through a pulley and cable system indicated generally as 35. Thus, on initial lifting of the door by the hog the door remains temporarily suspended in a position as substantially shown in dotted lines in Fig. 2, for a time sufficient to allow the hog to place his head thereunder without danger of the door falling with a hard impact on the hog's head. When the door does come down it is supported on the back of the hog's head at the roller 24 by virtue of the roller being below the level of the door bottom 19. As the hog enters the door opening 12 the roller 24 rolls across the back of its head and neck and across his back so that the door 11 is opened or lifted concurrently with the passing of the hog thereunder. Since the roller 24 is composed of wood there is no cold shock on the hog's back during cold weather conditions. When the hog has passed through the door opening 12 the door closes slowly behind him to avoid any possibility of injury to the hog by a rapid closing of the door after the roller 24 has passed over its back. To prolong the wear of the door bottom 19 and the door sill 21 each of these parts is covered with a sheet metal protecting plate 36 and 37, respectively.

Should it be desired to retain the door 11 in an open position there is provided a holding latch 38 (Fig. 4) of a substantially L-shape having the longer leg 40 adapted for insertion through aligned openings formed in a spacer member 16 of a door post 13 and in the door 11, the short leg of the latch 38 serving as a handle for manipulating the latch.

To prevent the hogs from either entering or leaving the hog-house there is provided for each of the lifting members 22 and 23 a substantially inverted L-shaped covering means 39 having a portion 41 extended over the top of a lifting member and detachably secured with a lifting member by bolt means or the like 42 (Fig. 5). Projected downwardly from the supporting member 41 and substantially to the ground is a guard member 43 which prevents a hog from getting his snout under a lifting member.

From a consideration of the above description it is seen that the invention provides a vertically movable door for a hog-house which is adapted to be opened by a hog by means of simple and rugged construction, comprised of a minimum number of movable parts and capable of efficient operation over a prolonged service life and under all weather conditions. The door-opening means in no way interferes with a complete closing of the door so that the hogs can lie down against the door to the inside of the house without danger of being affected by any air drafts. Further, the door-opening means is readily applied to existing hog-houses having vertically moving doors in a minimum of time, and are relatively low in initial cost so that the complete installation is accomplished with a minimum of expense. Although a hog-house has been referred to specifically in the description of the invention it is to be understood that the invention can also be used with other animal houses.

It is to be understood also that the invention is not limited to the preferred embodiment described and illustrated since modifications and changes can be made therein which are within the full intended scope of this invention as defined by the appended claims.

I claim:

1. In an animal house having a vertically slidable door, door sill means engageable with the bottom of said door to substantially air seal the door along said bottom when the door is in a closed position, means providing for the opening of said door by an animal including a laterally extended member on said door spaced upwardly from said door bottom and adapted to be engaged by a part of the animal's head and lifted to initially raise said door, roller means connected with said door adjacent the bottom of said door, and means supporting the roller means laterally of said door and below the level of the bottom of said door, with said roller means, after initial lifting of said door, being rollable across the head and back of an animal as it enters the animal house, and located to one side of the door sill means when the door is in said closing position.

2. In a hog-house having a vertically slidable door, a lateral projection carried on said door in spaced relation from the lower end thereof, with the lower side of said projection adapted to be engaged by a hog's snout to initially raise said door, with the initial raising of said door providing for the entrance of a hog's snout thereunder and said door being further opened concurrently with the passage of a hog thereunder, and cover means for said projection detachably connected with said projection and depended downwardly from the free end of said projection to a position adjacent a ground surface, to provide for the under side of said projection being inaccessible to a hog for door raising purposes.

3. In an animal house having a vertically slidable door with a continuous flat bottom side, side frame members for slidably supporting said door, a door sill engageable with said bottom side in flush engagement, means providing for the lifting of said door including a latch portion carried on said door in a spaced relation from said bottom side and projected laterally therefrom, with the under side of said latch portion adapted to be engaged by a portion of the head of an animal to initially lift said door to provide for the entrance of an animal's head thereunder, a roller extended transversely of said door between said frame members, and means for rotatably carrying said roller on said door below the level of said bottom side and spaced laterally from one side of said door to provide for said flush engagement of the bottom side of said door with said door sill, with said door, after said initial lifting by an animal, being lifted concurrently with the passage of an animal therethrough by the rolling of said roller across the head and the back of the animal.

JALMER M. SOLYST.